US009905065B2

(12) United States Patent
Michielan

(10) Patent No.: US 9,905,065 B2
(45) Date of Patent: Feb. 27, 2018

(54) RADIO CONTROLS FOR ELECTRIC DEVICES AND METHODS FOR TRANSMITTING COMMANDS THROUGH RADIO CONTROLS

(71) Applicant: CAME S.p.A., Dosson di Casier (IT)

(72) Inventor: Gianni Michielan, Mogliano Veneto (IT)

(73) Assignee: CAME S.p.A., Dosson di Casier (TV) (IT)

( * ) Notice: Subject to any disclaimer, the term of this patent is extended or adjusted under 35 U.S.C. 154(b) by 0 days.

(21) Appl. No.: 15/060,983

(22) Filed: Mar. 4, 2016

(65) Prior Publication Data

US 2016/0267733 A1 Sep. 15, 2016

(30) Foreign Application Priority Data

Mar. 10, 2015 (IT) .............................. MI2015A0359

(51) Int. Cl.
*G05B 19/00* (2006.01)
*G07C 9/00* (2006.01)
*G08C 17/02* (2006.01)

(52) U.S. Cl.
CPC ..... *G07C 9/00182* (2013.01); *G07C 9/00007* (2013.01); *G08C 17/02* (2013.01); *G07C 2009/00206* (2013.01); *G07C 2009/00253* (2013.01); *G08C 2201/62* (2013.01); *G08C 2201/63* (2013.01)

(58) Field of Classification Search
None
See application file for complete search history.

(56) References Cited

U.S. PATENT DOCUMENTS

| | | | | |
|---|---|---|---|---|
| 6,181,255 | B1 * | 1/2001 | Crimmins .......... | G07C 9/00309 340/12.28 |
| 6,249,673 | B1 * | 6/2001 | Tsui ...................... | G08C 19/28 340/12.28 |
| 2006/0109078 | A1 | 5/2006 | Keller et al. | |
| 2007/0152798 | A1 | 7/2007 | Witkowski | |

OTHER PUBLICATIONS

Italian Search Report for Italian Application No. IT/MI20150359 dated Nov. 12, 2015.

* cited by examiner

*Primary Examiner* — K. Wong
(74) *Attorney, Agent, or Firm* — MH2 Technology Law Group, LLP

(57) ABSTRACT

A radio control for electric devices may include: a containment body provided with at least one button, at least one electronic transmitter configured to transmit a unique code in a direction of the electric devices, and a microprocessor to which generated signals are sent, by pressing the at least one button, that is configured to control the at least one transmitter, and that is configured to determine the unique code. Each time the at least one button is pressed, the unique code may be transmitted by the at least one electronic transmitter at least once at a first frequency and then may be retransmitted at least once at a second frequency different than the first frequency.

20 Claims, 2 Drawing Sheets

RADIO CONTROLS FOR ELECTRIC DEVICES AND METHODS FOR TRANSMITTING COMMANDS THROUGH RADIO CONTROLS

CROSS-REFERENCE TO RELATED APPLICATION(S)

This application claims priority under 35 U.S.C. § 119 from Italian Patent Application No. MI 2015 A 000359, filed on Mar. 10, 2015, in the Italian Patent and Trademark Office, the entire contents of which are incorporated herein by reference.

The present invention refers to a radio control for electric devices.

In particular, the present invention refers to a radio for electric devices, like for example gates, doors, main doors and barriers in general.

Radio controls are typically used in automatic gates, which originally were actuated only with mechanical controls like buttons or key switches.

In over twenty years, the technology used for this type of products has evolved substantially, both in terms of the radio frequency part and for the encoding systems adopted. The first radio control systems worked at low frequency, over a range that extended from 27 to 41 MHz: they were therefore radio controls often of considerable size due to the antennae made of ferrite and the batteries used.

Over time they were then replaced by systems called "free frequency" operating at high frequency and in a band normally comprised between 260 and 350 MHz. This new category, longer needing to comprise bulky antennae and substantial power supply, gave rise to families of pocket-sized products. Thereafter, European standards regulated and set the frequencies that can be used for automation. There are currently four frequencies in use: two at low frequency (40.665 MHz and 40.685 MHz) and two at high frequency (433.92 MHz and 868.35 MHz).

The other aspect, the most important one of a radio control, is its encoding. This term means the information trnasmitted (code) on the carrier (frequency) to make it reach another different point from where it started. The first radio controls used a fixed code encoding, i.e. information that was always the same and never changed and this code was set by a component located on the transmitter—the so-called "dip-switch", formed from a series of small switches arranged in a row.

Thereafter, this component was eliminated to reduce the size of the radio control, and therefore if before it was simple to set a personal code, today it is less so, since most manufacturers set it in the factory and it can no longer be modified by the user, of course with a few exceptions.

Recently, this encoding has been added to by another, with a dynamic code or variable code.

This encoding technique was wanted to make the use of these products more secure with respect to fixed code, but also to make it difficult to copy the original radio control, thus restricting the spread of compatible products. The operating principle of the dynamic code is that of always transmitting a different code from the previous one upon each activation of the transmitter, of course the new code also changes in the receiver, which ensures that the two products are always synchronised.

The objective in actual radio controls is to increase as much as possible the reliability in the execution of the controls imparted and security, in the attempt to prevent them from being cloned.

The present invention refers to a radio control of this type in which security and reliability are both improved with respect to radio controls of the known art.

An aspect of the present invention relates to a radio control for electric devices having the features of the attached claim 1.

A further aspect of the present invention relates to a method for transmitting a control to an electric, device through a radio control having the features of the attached claim 9.

The features and advantages of the radio control according to the present invention will become clearer from the following description, given as an example and not for limiting purposes, referring to the attached schematic drawings, in which.

With reference to the mentioned figures, the radio control according to the present invention comprises a containment body, for example box-shaped 2, inside which an electronic board is inserted, the functionalities of which are activated through at least one button 3 provided on such a box-shaped body.

Figure 2:
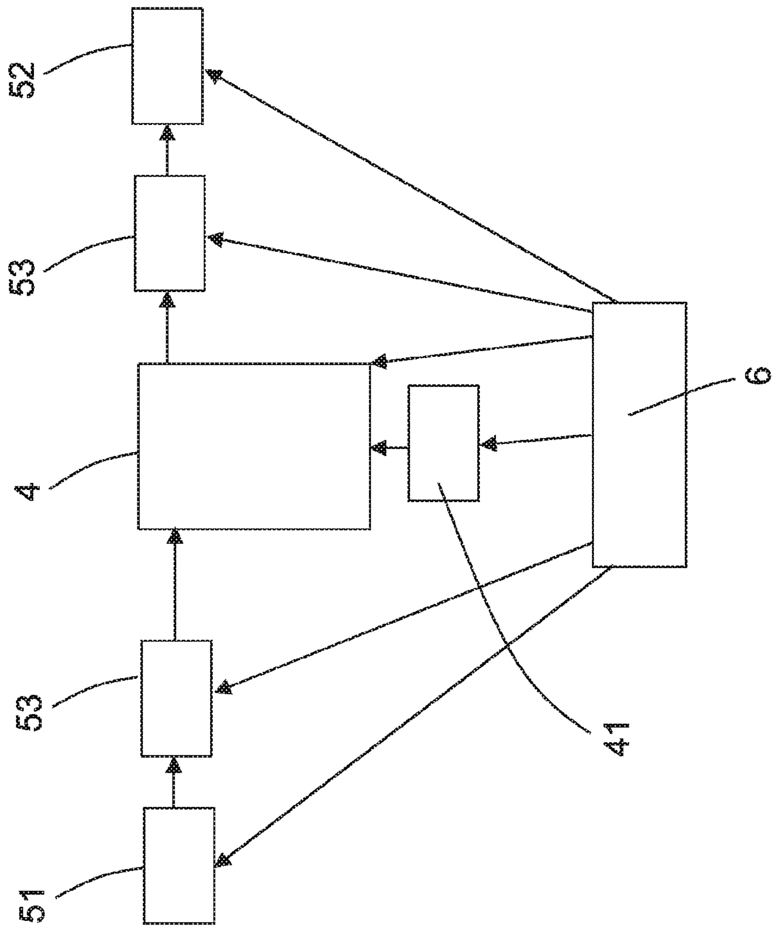
FIG. 2 is a block diagram of the electronic circuits present inside the transmitter according to the present invention.
Figure 1:
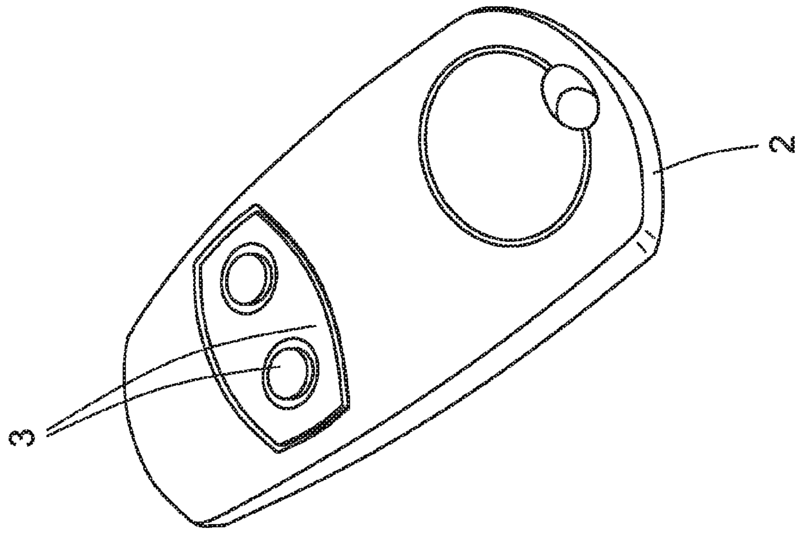
FIG. 1 is a perspective view of a radio control with two buttons according to the present invention.

The block diagram of such an electronic board is illustrated schematically in FIG. 2 illustrating a microprocessor 4 that receives the signals of such buttons 3 and that generated by an encoder 41, advantageously of the variable code type. Alternatively, instead of the variable code encoder a "dip switch" can be inserted that is formed from a plurality of switches encapsulated in a single container, equipped with terminals arranged over two rows at normalised distance. The switches are preferably switches with two positions and alternatively with more than two positions. By acting on each of such switches it is possible to generate a unique frame or key that can be predetermined and modified according to the type of use that is wished to be obtained of the radio control.

The electronic board also comprises at least one receiver 51, and a transmitter 52 connected to such a controller 4 and electrical power supply means 6 that provide the power supply necessary for all of the components of the electronic board. Such power supply means preferably comprise a single 3V battery (CR2032). Moreover, on such a board there are suitable amplifying, filtering and frequency modulation means 53 of the signals received by such a receiver and for the signals to be sent to said transmitter.

Moreover, the radio control is provided with at least one suitable luminous signalling device (for example with LEDs) controlled by the microprocessor.

The radio control operates in the following way.

Figure 3:
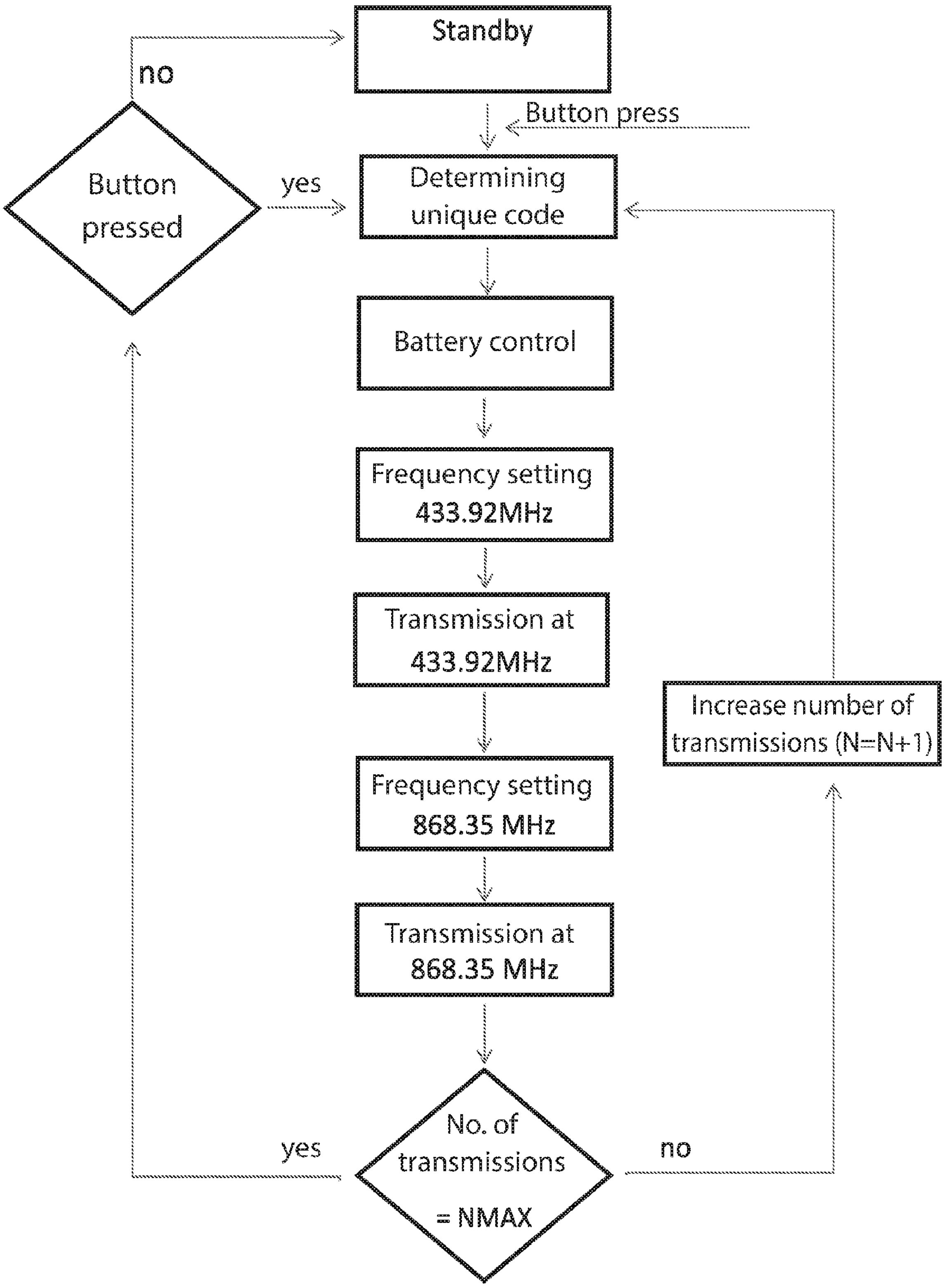
FIG. 3 is a flow algorithm of the operation of the radio control according to the present invention.

With reference to the algorithm of FIG. 3, the radio control is in the stable "stand by" condition, i.e. in which there is the minimum consumption of the power supply battery 6.

When one of the buttons 3 is pressed, the radio control comes out of the standby mode and determines a code to be transmitted through the encoder 41, preferably a code determined by a variable code encoding.

Such a code is transmitted through the mentioned transmitter at least once at a first frequency (for example 433.92 MHz) and then retransmitted at least once at a second frequency (for example 868.35 MHz).

Once the two transmissions have ended, the correct transmission of the code is signalled, for example through the help of such LEDs.

Advantageously, each time the button is pressed such a code is transmitted a predetermined number of times alternately over the two frequencies up to the maximum number NMAX.

The device will continue to transmit until the button previously pressed is released.

Preferably, before each code transmission a battery control procedure monitors the level of the battery 6 itself of the radio control. In the case of a low battery level the radio control emits a signal, for example luminous (e.g. intermittent flashing) before signalling that the transmission has been carried out.

The invention claimed is:

1. A radio control for electric devices, the radio control comprising:

a containment body provided with one or more buttons, inside of which there is an electronic board including at least one electronic transmitter configured to transmit a unique code in a direction of the electric devices, and a microprocessor, to which generated signals are sent by pressing a first button of the one or more buttons, that is configured to control the at least one electronic transmitter, and that is configured to determine the unique code;

wherein each time the first button is pressed, the unique code is transmitted by the at least one electronic transmitter at least once at a first frequency and then is retransmitted at least once at a second frequency different than the first frequency, wherein each time the first button is pressed, the unique code is transmitted a predetermined number of times alternately over the first and second frequencies, and wherein the radio control will continue to transmit until the first button is released.

2. The radio control of claim 1, wherein the first frequency is 433.92 MHz, and wherein the second frequency is 868.35 MHz.

3. The radio control of claim 1, further comprising:

a luminous signalling device.

4. The radio control of claim 1, wherein before each transmission of the unique code, a power supply procedure is activated, which monitors a level of a power supply of the radio control.

5. The radio control of claim 4, wherein in a case of low level of the power supply of the radio control, the radio control emits a luminous signal.

6. The radio control of claim 3, wherein correct transmission of the unique code is indicated through the luminous signalling device.

7. The radio control of claim 1, wherein the unique code is of a variable-code type.

8. A method for transmitting a command to an electrical device through a radio control, the method comprising:

determining a unique code to be transmitted;

transmitting the unique code at least once at a first predetermined frequency; and transmitting the unique code at least once at a second predetermined frequency;

wherein each time the unique code is transmitted, the unique code is transmitted a predetermined number of times alternately over the first and second predetermined frequencies, and wherein the transmitting continues until a button of the radio control that was pressed to start the transmitting is released.

9. The method of claim 8, further comprising:

indicating successful transmission of the unique code after determining the unique code, transmitting the unique code at least once at the first predetermined frequency, and transmitting the unique code at least once at the second predetermined frequency.

10. The method of claim 8, further comprising:

checking and signalling a charge state of a power supply of the radio control prior to transmission of the unique code.

11. The method of claim 8, wherein the transmission of the unique code takes place by pressing at least one button of the radio control.

12. A radio control for electric devices, the radio control comprising:

a containment body that comprises:

one or more buttons;

at least one transmitter; and a microprocessor configured to control the at least one transmitter;

wherein when a user operates a first button of the one or more buttons, a signal is sent to the microprocessor, wherein when the microprocessor receives the signal, the microprocessor determines a unique code and provides the unique code to the at least one transmitter, wherein when the microprocessor provides the unique code to the at least one transmitter, the at least one transmitter transmits the unique code, wherein each time the at least one transmitter transmits the unique code, the at least one transmitter transmits the unique code at least once at a first frequency and at least once at a second frequency different than the first frequency, wherein each time the first button is pressed, the unique code is transmitted a predetermined number of times alternately over the first and second frequencies, and wherein the radio control will continue to transmit until the first button is released.

13. The radio control of claim 12, wherein the first frequency is 433.92 MHz.

14. The radio control of claim 12, wherein the second frequency is 868.35 MHz.

15. The radio control of claim 12, wherein the unique code is of a variable-code type.

16. The radio control of claim 12, further comprising:

a power supply operatively connected to the at least one transmitter.

17. The radio control of claim 16, wherein the power supply comprises a battery.

18. The radio control of claim 12, further comprising:

at least one receiver operatively connected to the microprocessor.

19. The radio control of claim 1, wherein the first frequency is 433.92 MHz.

20. The radio control of claim 1, wherein the second frequency is 868.35 MHz.

* * * * *